July 13, 1954 T. J. REY 2,683,819

REGISTERS SUCH AS ARE EMPLOYED IN DIGITAL COMPUTING APPARATUS

Filed May 28, 1952

Inventor:
THOMAS JULIUS REY
By Ralph E. Atherton
Attorney

Patented July 13, 1954 2,683,819

UNITED STATES PATENT OFFICE 2,683,819

REGISTERS SUCH AS ARE EMPLOYED IN DIGITAL COMPUTING APPARATUS

Thomas Julius Rey, Hayes, England, assignor to Electric & Musical Industries Limited, Hayes, England, a company of Great Britain Application May 28, 1952, Serial No. 290,520

Claims priority, application Great Britain June 5, 1951

4 Claims. (Cl. 307—88)

Figure 1:
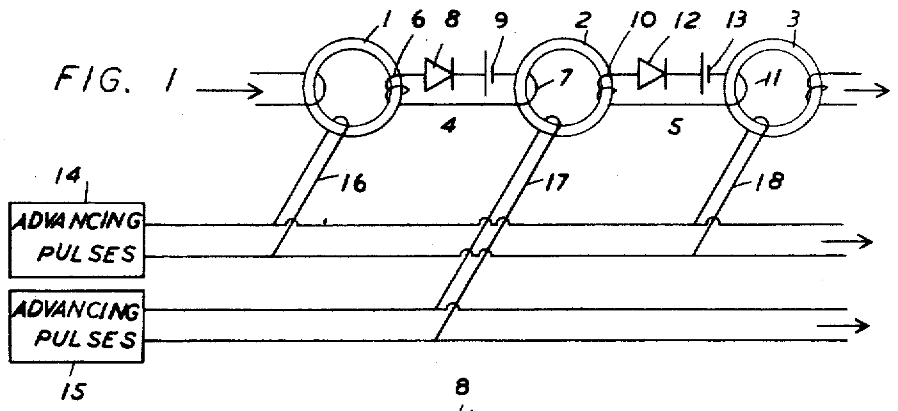

This invention relates to registers such as are employed in digital computing apparatus.

A form of shifting register, which comprises a series of magnetizable cores coupled by links each of which links one core with the succeeding core, has been described in an article entitled "Static magnetic storage and delay line," by Wang and Woo, published in volume 21 of the Journal of Applied Physics, page 491 et seq. The register utilises the properties of the hysteresis loop and the binary digit values "0" and "1" are assigned to the opposite state of remanence magnetism of the cores. In addition to the links each core is associated with a coupling whereby current pulses are applied to set up a magnetising force of such magnitude and polarity that if the respective core is in state "1" it is changed to state "0" and by reason of the link with the next core, this change is accompanied by a change in the next core from state "0" to state "1," no change being effected in the state of either core if a current pulse occurs when the first core is in state "0." Such current pulses are referred to as advancing pulses since they are effective to advance digital information stored in one core to the next core. Digital information is fed in time-serial manner to the first core of the register so that this core assumes the state representative of the value of each digit in turn, each digit being cleared to the next core by advancing pulses applied to the first core mid-way between digit times, advancing pulses being applied to all the odd-numbered cores at the same time. Moreover, advancing pulses are applied to each intervening core at digit times, and the effect is that each digit is shifted by a distance of 2 cores in each digit interval. There are therefore 2 cores per digit and for this reason a register of this form is referred to as a two-core unit magnetic-core shifting register.

There is the difficulty with shifting registers of this form that, when an advancing pulse causes any core to change from state "1" to state "0," the tendency exists for the information to be propagated not only in the forward direction but also in the backward direction. For instance, assuming a series of cores A,B,C, . . . etc., the change of flux occurring when core B is changed from state "1" to state "0" by an advancing pulse not only induces a current in the link between that core and the succeeding core C of such magnitude and direction as to change C from state "0" to state "1," as desired, but it also tends to induce a current of the same sense in the link between the preceding core A and core B, this latter current tending to change core A from state "0" to state "1." Such a change is, of course, undesirable. Moreover, the desired change of core C from state "0" to state "1" tend to induce a reversed current in the link between C and the next core and this is also undesirable. The latter current can be largely attenuated by the employment of unilaterally conductive links but it will be appreciated that this expedient is not of itself sufficient to prevent the tending-backward propagation from core B to core A.

The object of the present invention is to provide an improved digital computing apparatus employing magnetizable cores for storing and propagating digital information, with a view to reducing the above described difficulties.

According to the present invention there is provided digital computing apparatus comprising more than two magnetizable cores coupled by links for the purpose of propagating digital information from one core to another core, and wherein there in included in each link a polarised device and each link has a turns-ratio which is so related to the threshold of said polarised device that when propagation from one core to another core is caused, undesired propagation from the first core to further cores coupled therewith is prevented.

The polarised device, by which is meant a device which presents a different impedance to the flow of current in opposite directions, may comprise for example, a rectifier or a biassed choke. The threshold of such a device is the potential difference which is required to be set up across the device to produce a sufficient flow of current to cause propagation of digital information, and as will hereinafter appear the threshold may be artificially increased, particularly in the case where the device comprises a rectifier. The expression "turns ratio" used herein and in the claims is intended to mean the ratio of the number of turns of the link round the first of two coupled cores to the number of turns of the link round the second of said coupled cores.

Figure 2:
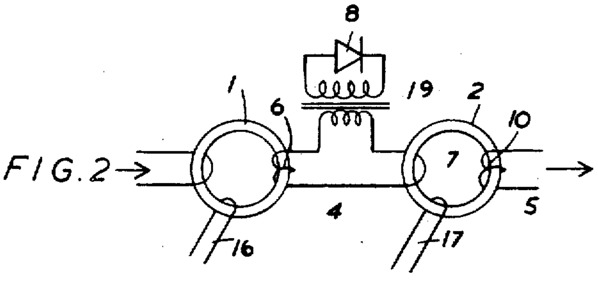
Figure 3:
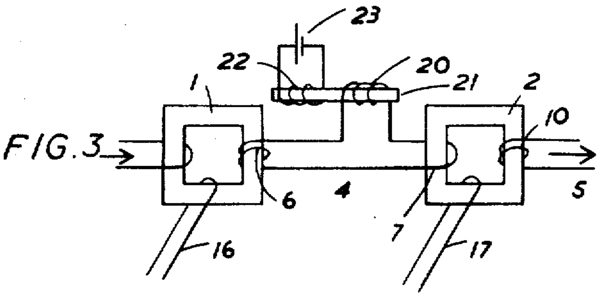

In order that the said invention may be clearly understood and readily carried into effect, the same will now be more fully described with reference to the accompanying drawings, in which:

Figure 1 illustrates one application of the present invention to a two-core unit magnetic-core shifting register, and Figures 2 and 3 illustrate modifications of Figure 1.

Referring to Figure 1, there are illustrated three magnetizable cores 1, 2 and 3 which will be assumed to comprise some of the cores in a two-core unit magnetic-core shifting register for a computor operating in the time-serial mode. The register may have any number of cores depending upon the word length adopted in the computing apparatus. A link 4 couples the core 1 to the core 2 for the propagation of digital information from the core 1 to the core 2, and similarly the core 2 is coupled to the core 3 by another link 5. The core 1 is also coupled with the preceding core whilst the core 3 is similarly coupled with the succeeding core of the register. The link 4 is wound a predetermined number of times round the core 1 to form a winding 6 and a lesser number of times round the core 2 to form a winding 7. Moreover, a rectifier 8, for example a metal rectifier, and a battery 9 or other source of D. C. bias potential are connected in series in the link. The battery 9 augments the natural threshold of the rectifier. The link 5 between the cores 2 and 3 similarly includes windings 10 and 11, a rectifier 12 and a battery 13. The odd-numbered cores of the register are coupled to a source 14 of advancing pulses, whilst the even-numbered cores are coupled to another source 15 of advancing pulses, the source 14 being arranged to deliver pulses at digit times to the cores to which it is coupled and the source 15 being arranged to deliver pulses mid-way between digit times. In the drawing, the coupling is illustrated by means of windings 16 and 18 which couple the cores 1 and 3 to the source 14, and a winding 17 which couples the core 2 to the source 15.

As described in the publication aforesaid, successive pairs of the cores in the register from digit-storage units and the cores 1 and 2 may be taken as representative of one such unit while the core 3 may then be regarded as the first core of the succeeding unit. Propagation of digits through the register is effected by alternate pulses from the sources 14 and 15. Assume for example that at a time just before the occurrence of a pulse from the source 14, the core 1 is magnetised to a state representative of a digit of value "1." As will hereinafter appear all the even-numbered cores and thus the core 2, are magnetised to the state representative of "0" at such a time. When a pulse from the source 14 occurs it changes the state of magnetisation of the core 1 to that representative of "0." The resultant flux change in the core 1 induces an E. M. F. across the winding 6 and it is arranged that, in accordance with the invention, the turns ratio of the link 4 (as hereinbefore defined) is such that the E. M. F. induced is sufficient to overcome the threshold of the rectifier 8 augmented by the battery 9 and cause sufficient current in the winding 7 to change the state of magnetisation of the core 2 from the state "0" to the state "1." The ensuing flux change in the core 2 sets up an E. M. F. across the winding 10 but the polarity of this E. M. F. is opposite to that of the rectifier 12 which therefore prevents the flow of any current in the link 5. Any disturbance of the state of magnetisation of the core 3 is therefore prevented. If, on the other hand, just before the occurrence of the pulse from the source 14 the core 1 is magnetised to the state representative of "0," the pulse causes no change in the magnetisation of the core 1 and hence the core 2 is not changed from state "0." Similar considerations apply to each odd-numbered core in the register so that a pulse from the source 14 leaves all the odd-numbered cores in state "0." Half the digit interval later, the source 15 delivers a pulse to the even-numbered cores which, as will be appreciated, are in the same states as the corresponding odd-numbered cores before the previous pulse from the source 14. Assume that the core 2 for example is in state 1, this state is propagated to the core 3 by the same mechanism as described above with regard to the cores 1 and 2, and the core 2 and likewise all even-numbered cores are left in state "0." The flux change in the core 2, however, induces an E. M. F. across the winding 7 which tends to cause current to flow through the rectifier 8 in its conducting direction and to disturb the state of magnetisation of the core 1, but by suitable choice of the turns ratio of the link 4 in relation to the threshold of the rectifier 8, the flow of current in the link 4 is prevented, at least to such an extent as to bring about a significant change in the magnetisation of the core 1. The same consideration applies to any tendency for backward propagation from each core of the register.

The magnetizable cores of the register, which are merely shown symbolically in Figure 1, may be in the form of toroids of small diameter, constructed for example of several convolutions of strip, made of the alloy known as H. C. R., with insulation between adjacent convolutions. If the cores are of such construction, the impedance per turn of the windings on the cores is very small and it is also desirable for incidental reasons to have a small number of turns in each winding. The practical disadvantage may then arise that the impedance of the rectifiers when conducting is large compared with the impedance of the windings.

Figure 2 shows a modification of Figure 1 which is designed to reduce this disadvantage. Corresponding parts in Figures 1 and 2 have the same reference numeral, and for convenience only the cores 1 and 2 are shown. According to Figure 2, the rectifier 8 is connected in the circuit of the secondary winding of a transformer 19 whose primary winding is included in the link 4.

The turns ratio of a transformer is such that the impedance of the rectifier 8 as transferred into the circuit of the primary winding is of the same order of magnitude as the impedance of the windings 6 and 7. No battery 9 is illustrated in Figure 2 and it is to be assumed that in this case the natural threshold of the rectifier is such that, in conjunction with the turns ratio of the link 4, backward propagation between the core 2 and the core 1 is prevented.

In Figure 3, only two cores 1 and 2 are again illustrated and in the case of this figure, the rectifier 8 is replaced by a choke 20 which has a magnetisable core indicated diagrammatically at 21. A biassing winding 22 is applied to this core connected with a battery 23 which maintains current in the winding 22 such as to bias the core 21 magnetically. This magnetic bias is arranged to be such that, when the storage core 1 is changed by an advancing pulse from state "1" to state "0," the E. M. F. induced in the winding 6 is sufficient to drive the core 21 into a magnetically saturated condition. In this condition the choke 20 has a low inductance and the flow of current in the link 4 is not greatly impeded so that sufficient current can flow to produce the desired change of state in the succeeding core 2. When, on the other hand, the core 2 is changed by an advancing pulse from the source 15 from state "1" to state "0" to cause propagation to the core 3, the E. M. F. induced across the winding 7 is insufficient to drive the core 21 to magnetic saturation and the choke 20 functions with such a high impedance that insufficient current flows in the link 4 to change the state of the core 1. Backward propagation in the register is therefore prevented. Moreover, with the arrangement of Figure 3, it is arranged that any reverse E. M. F. such as would be induced across the winding 10 when the core 2 is changed from state "0" to state "1" in response to change of state in the core 1 causes the choke in the link 5 corresponding to 20 to operate in the region of high impedance so that insufficient energy is transferred to produce a change of state in the core 3.

In Figure 3 the cores of the register instead of being toroids are in the form of flat lamina of square configuration. Such lamina are stamped from strips of H. C. R. alloy and this form of core has the advantage that air gaps, tending to produce demagnetisation of the cores are avoided. Cores of this form, stamped from rolled strip, can be magnetised with equal facility both in the direction of rolling and in the transverse direction.

While the invention is described as applied to a two-core unit magnetic-core shifting register for computors operating in the time serial mode it is to be understood that it may find other applications. For example it may find application in computing apparatus operating in the parallel mode as described for example in the specification of co-pending British application No. 13,263/51.

What I claim is:

1. A register for digital computing apparatus comprising a series of more than two magnetizable cores, means for inducing magnetization changes in the individual cores, electrical conductive links coupling said cores in cascade with each link coupling one core to a succeeding core for propagating magnetization changes from one core to another, a polarized device connected in series in each link for rendering the link sensitive to magnetization changes of only a single polarity, the threshold in each polarized device being predetermined in relation to the ratio of the turns of the respective link round the first of two coupled cores to the turns of the link round the second of two coupled cores to confine the propagation of magnetization changes to a single direction.

2. A register according to claim 1, said polarized device comprising the series combination of a rectifier and a source of bias potential poled to augment the natural threshold of said rectifier.

3. A register according to claim 1, said polarized device comprising a step-up transformer having a primary winding connected in series in said link, a secondary winding coupled to said primary winding, and a rectifier connected across said secondary winding.

4. A register according to claim 1, said polarized device comprising a choke having a magnetizable core, and means for biassing said core with magnetization.

References Cited in the file of this patent

"Static Magnetic Storage and Delay Line," by An Wang et al. in the "Journal of Applied Physics," January 1950, pp. 49–54.

"Progress Report (2)" on the EDVAC, vol. II, June 30, 1946, Moore School of Electrical Engineering, U. of Pa., Philadelphia, Pa., paragraph 4.2.12 and Figs. 16 and 17 *a*, *b*, and *c*.

Disclaimer 2,683,819.—*Thomas Julius Rey*, Hayes, England. REGISTERS SUCH AS ARE EMPLOYED IN DIGITAL COMPUTING APPARATUS. Patent dated July 13, 1954. Disclaimer filed Nov. 5, 1957, by the inventor, the assignee, *Electric & Musical Industries Limited*, consenting.

Hereby enters this disclaimer to claims 1 and 2 of said patent.

[*Official Gazette December 17, 1957.*]